United States Patent
Shin et al.

(10) Patent No.: US 10,733,274 B2
(45) Date of Patent: Aug. 4, 2020

(54) BIOMETRIC AUTHENTICATION USING GESTURE

(71) Applicant: SUPREMA INC., Gyeonggi-do (KR)

(72) Inventors: Hochul Shin, Gyeonggi-do (KR);
Kideok Lee, Gyeonggi-do (KR);
Hyeonchang Lee, Gyeonggi-do (KR);
Jong Man Lee, Gyeonggi-do (KR);
Bong Seop Song, Gyeonggi-do (KR);
Jae Won Lee, Gyeonggi-do (KR)

(73) Assignee: SUPREMA INC., Gyeonggi-do (KR)

( * ) Notice: Subject to any disclaimer, the term of this patent is extended or adjusted under 35 U.S.C. 154(b) by 90 days.

(21) Appl. No.: 15/209,457

(22) Filed: Jul. 13, 2016

(65) Prior Publication Data
US 2017/0046508 A1    Feb. 16, 2017

(30) Foreign Application Priority Data
Aug. 11, 2015  (KR) .......................... 10-2015-0113263

(51) Int. Cl.
*G06F 21/32* (2013.01)
*G06K 9/00* (2006.01)
*G06F 21/31* (2013.01)

(52) U.S. Cl.
CPC .............. *G06F 21/32* (2013.01); *G06F 21/31* (2013.01); *G06K 9/00892* (2013.01)

(58) Field of Classification Search
CPC .......... G06F 21/32; G06F 21/31; G06F 21/45; G06K 9/00892
USPC .......................................................... 726/18
See application file for complete search history.

(56) References Cited

U.S. PATENT DOCUMENTS

| | | | | |
|---|---|---|---|---|
| 6,735,695 | B1* | 5/2004 | Gopalakrishnan | G06F 21/32 713/186 |
| 8,509,488 | B1* | 8/2013 | Enge | G01C 21/3623 382/106 |
| 8,539,550 | B1* | 9/2013 | Terres | G06F 21/31 726/16 |
| 8,819,812 | B1* | 8/2014 | Weber | G06F 3/017 726/18 |
| 9,465,368 | B1* | 10/2016 | Mitter | G05B 1/00 |
| 9,607,138 | B1* | 3/2017 | Baldwin | G06F 21/32 |
| 9,679,197 | B1* | 6/2017 | Sills | G06K 9/00389 |
| 9,706,406 | B1* | 7/2017 | Adams | H04W 12/08 |
| 9,898,642 | B2* | 2/2018 | Han | G06K 9/00033 |

(Continued)

FOREIGN PATENT DOCUMENTS

| | | |
|---|---|---|
| JP | 2007/249586 | 9/2007 |
| JP | 2012-083829 | 4/2012 |
| KR | 10-2014-0107946 | 9/2014 |

*Primary Examiner* — Shahriar Zarrineh
(74) *Attorney, Agent, or Firm* — Knobbe Martens Olson & Bear LLP

(57) ABSTRACT

There is provided a biometric authentication method using a portable electronic device. The method includes identifying a gesture of a user to be authenticated through a gesture recognition unit of the portable electronic device and acquiring biometric information of the user through an information input unit of the portable electronic device. The method further includes comparing the identified gesture and the acquired biometric information with an authentication information stored in an information storage unit to perform the biometric authentication of the user, and outputting a result of the biometric authentication.

8 Claims, 6 Drawing Sheets

(56) References Cited

U.S. PATENT DOCUMENTS

| | | | |
|---|---|---|---|
| 10,108,791 B1* | 10/2018 | Masterman | G06F 21/32 |
| 2004/0088584 A1* | 5/2004 | Shachar | G07C 9/00158 |
| | | | 726/6 |
| 2004/0250084 A1* | 12/2004 | Hamid | G06F 21/32 |
| | | | 713/186 |
| 2005/0171851 A1* | 8/2005 | Applebaum | G06F 21/32 |
| | | | 705/18 |
| 2005/0243061 A1* | 11/2005 | Liberty | A61B 5/1171 |
| | | | 345/158 |
| 2007/0005988 A1* | 1/2007 | Zhang | G06F 21/32 |
| | | | 713/186 |
| 2007/0226509 A1 | 9/2007 | Senga et al. | |
| 2007/0241861 A1* | 10/2007 | Venkatanna | G06F 21/32 |
| | | | 340/5.52 |
| 2008/0219559 A1* | 9/2008 | Koike | G06F 3/0346 |
| | | | 382/190 |
| 2008/0279477 A1* | 11/2008 | Yamazaki | G06T 1/60 |
| | | | 382/293 |
| 2009/0175509 A1* | 7/2009 | Gonion | G06F 1/3231 |
| | | | 382/118 |
| 2010/0205667 A1* | 8/2010 | Anderson | G06F 3/013 |
| | | | 726/19 |
| 2010/0225443 A1* | 9/2010 | Bayram | G06F 21/316 |
| | | | 340/5.83 |
| 2010/0316265 A1* | 12/2010 | Nakanowatari | G06F 21/32 |
| | | | 382/118 |
| 2011/0126280 A1* | 5/2011 | Asano | G06F 21/32 |
| | | | 726/19 |
| 2011/0135167 A1* | 6/2011 | Imaoka | G06F 21/32 |
| | | | 382/118 |
| 2011/0282785 A1* | 11/2011 | Chin | G06F 3/04883 |
| | | | 705/42 |
| 2012/0007713 A1* | 1/2012 | Nasiri | G06F 1/1694 |
| | | | 340/5.81 |
| 2012/0081282 A1* | 4/2012 | Chin | G06F 3/011 |
| | | | 345/156 |
| 2012/0200601 A1* | 8/2012 | Osterhout | G02B 27/0093 |
| | | | 345/633 |
| 2013/0044922 A1* | 2/2013 | Hio | G09F 27/00 |
| | | | 382/118 |
| 2013/0137483 A1* | 5/2013 | Senoo | G09G 5/00 |
| | | | 455/556.1 |
| 2013/0174213 A1* | 7/2013 | Liu | G02B 27/017 |
| | | | 726/1 |
| 2013/0223696 A1* | 8/2013 | Azar | G06K 9/00892 |
| | | | 382/118 |
| 2013/0227678 A1* | 8/2013 | Kang | G06F 21/32 |
| | | | 726/19 |
| 2013/0267204 A1* | 10/2013 | Schultz | H04W 12/06 |
| | | | 455/411 |
| 2013/0278552 A1* | 10/2013 | Kamin-Lyndgaard | |
| | | | G09G 5/006 |
| | | | 345/174 |
| 2013/0293468 A1* | 11/2013 | Perez | G06F 3/033 |
| | | | 345/158 |
| 2013/0342672 A1* | 12/2013 | Gray | G06F 3/013 |
| | | | 348/78 |
| 2014/0006794 A1* | 1/2014 | Odessky | G06F 21/36 |
| | | | 713/182 |
| 2014/0099005 A1* | 4/2014 | Mogi | G06K 9/00288 |
| | | | 382/118 |
| 2014/0109018 A1* | 4/2014 | Casey | G06F 3/04895 |
| | | | 715/863 |
| 2014/0109200 A1* | 4/2014 | Tootill | G06F 21/32 |
| | | | 726/5 |
| 2014/0123275 A1* | 5/2014 | Azar | H04W 12/06 |
| | | | 726/19 |
| 2014/0126782 A1* | 5/2014 | Takai | G06K 9/0061 |
| | | | 382/116 |
| 2014/0147020 A1* | 5/2014 | Baldwin | H04N 21/2541 |
| | | | 382/118 |
| 2014/0168070 A1* | 6/2014 | Jeong | G06F 3/013 |
| | | | 345/156 |
| 2014/0223549 A1* | 8/2014 | Quintanilla | G06F 21/31 |
| | | | 726/19 |
| 2014/0240664 A1* | 8/2014 | Divo | G02C 13/005 |
| | | | 351/204 |
| 2014/0241593 A1* | 8/2014 | Koseki | G06F 21/32 |
| | | | 382/118 |
| 2014/0294254 A1* | 10/2014 | Kim | G06F 21/32 |
| | | | 382/118 |
| 2014/0310764 A1* | 10/2014 | Tippett | G06F 21/31 |
| | | | 726/1 |
| 2014/0333413 A1* | 11/2014 | Kursun | G06K 9/00892 |
| | | | 340/5.52 |
| 2014/0333415 A1* | 11/2014 | Kursun | G06F 21/32 |
| | | | 340/5.83 |
| 2014/0337930 A1* | 11/2014 | Hoyos | H04L 63/10 |
| | | | 726/4 |
| 2014/0341440 A1* | 11/2014 | Walch | G06F 21/40 |
| | | | 382/116 |
| 2014/0344922 A1* | 11/2014 | Lam | G06F 21/629 |
| | | | 726/19 |
| 2015/0007295 A1* | 1/2015 | Hou | H04L 9/3231 |
| | | | 726/7 |
| 2015/0112606 A1* | 4/2015 | He | G06F 21/00 |
| | | | 702/19 |
| 2015/0113631 A1* | 4/2015 | Lerner | G06F 21/32 |
| | | | 726/16 |
| 2015/0138101 A1* | 5/2015 | Park | G06F 3/0412 |
| | | | 345/173 |
| 2015/0213244 A1* | 7/2015 | Lymberopoulos | G06F 21/32 |
| | | | 726/18 |
| 2015/0220716 A1* | 8/2015 | Aronowitz | G06F 21/32 |
| | | | 706/12 |
| 2015/0264572 A1* | 9/2015 | Turgeman | H04W 12/06 |
| | | | 455/411 |
| 2015/0278498 A1* | 10/2015 | Hong | G06F 21/32 |
| | | | 340/5.82 |
| 2015/0295922 A1* | 10/2015 | Dunn | G06F 16/93 |
| | | | 713/178 |
| 2015/0302252 A1* | 10/2015 | Herrera | G06K 9/00617 |
| | | | 382/117 |
| 2015/0310197 A1* | 10/2015 | Oh | G06F 21/32 |
| | | | 726/19 |
| 2015/0324113 A1* | 11/2015 | Kapp | G06F 3/04883 |
| | | | 715/863 |
| 2015/0334567 A1* | 11/2015 | Chen | G06T 7/97 |
| | | | 455/411 |
| 2015/0339511 A1* | 11/2015 | Thomet | A61B 5/0077 |
| | | | 348/78 |
| 2015/0378433 A1* | 12/2015 | Savastinuk | G06K 9/00255 |
| | | | 345/156 |
| 2016/0006721 A1* | 1/2016 | Patel | H04L 63/0815 |
| | | | 726/8 |
| 2016/0078268 A1* | 3/2016 | Mankowski | G06F 21/32 |
| | | | 382/124 |
| 2016/0085564 A1* | 3/2016 | Arcese | G06F 9/4451 |
| | | | 726/7 |
| 2016/0180078 A1* | 6/2016 | Chhabra | G06F 21/31 |
| | | | 726/19 |
| 2016/0373647 A1* | 12/2016 | Garcia Morate | H04N 5/23222 |
| 2017/0235935 A1* | 8/2017 | Song | G06F 21/32 |
| | | | 726/19 |

* cited by examiner

BIOMETRIC AUTHENTICATION USING GESTURE

CROSS-REFERENCE TO RELATED APPLICATIONS

This application claims the benefit of Korean Patent Application No. 10-2015-0113263, filed on Aug. 11, 2015, which is incorporated herein by reference in its entirety.

BACKGROUND OF THE INVENTION

1. Field of the Invention

The present disclosure relates to a biometric authentication. More particularly, the present disclosure relates to a biometric authentication for implementing both security and convenience of the biometric authentication.

2. Description of the Related Art

As well known, exemplary features used in current biometric systems include features of a face, a voice, a hand shape, an iris and a fingerprint, each of which has been positively studied.

Recently, a portable electronic device, e.g., a smartphone also employs biometrics, and the most common biometric technology among various biometric technologies is a fingerprint recognition. The fingerprint recognition has advantages of higher security and usability over other biometric recognition technologies.

However, most fingerprint recognition sensors equipped in the portable electronic device such as the smartphone are very small to meet cost and spatial requirements and thus receive very small part of the fingerprint. Using the small part of the fingerprint contributes to lowering a security level because of lack of fingerprint feature information.

The security level is generally determined by means of a false acceptance rate. In a case where the fingerprint recognition is performed with respect to a whole fingerprint, the false acceptance rate is about 1/one hundred million. However, in a case where the fingerprint recognition is performed with respect to part of a fingerprint as in the portable electronic device, lowering the false acceptance rate to below 1/one hundred thousand is difficult. Therefore, it is very risky to use such fingerprint recognition employed in the portable electronic device for a payment or a finance-related service for which high security is essential.

Conventionally, the portable electronic device uses a password authentication method additionally to enhance security of the biometric recognition, e.g., the fingerprint recognition. However, it creates a burden on the user of having to remember the password, and having to enter the password for the biometric authentication (see, e.g., Korean Patent Application Publication No. 2012-0122587).

SUMMARY OF THE INVENTION

In view of the above, the present disclosure provides a biometric authentication by additionally authenticating a gesture of a user to be authenticated.

It should be noted that the objects are not limited to that mentioned above, and other objects will be apparently understood by those skilled in the art to which the present disclosure belongs.

In accordance with an aspect of the present disclosure, there is provided a non-transitory computer-readable storage medium including computer-executable instructions, which cause, when executed by a processor, the processor to perform a method for biometric authentication using a portable electronic device, the method including: identifying a gesture of a user to be authenticated; acquiring biometric information of the user; comparing the identified gesture and the acquired biometric information with pre-registered authentication information to perform the biometric authentication of the user; and outputting a result of the biometric authentication.

The gesture is performed with the portable electronic device and the gesture may be determined by at least one of a motion of the user performed with the portable electronic device, a positional angle of the portable electronic device, and a touch operation on the portable electronic device for a predetermined time period.

The motion and the positional angle may be measured by an inertial sensor equipped in the portable electronic device.

The positional angle may be measured by an imaging device integrally equipped in the portable electronic device.

The positional angle may be obtained by measuring a position or a gradient of an object in an image captured by the imaging device.

The process of comparing the identified gesture and the acquired biometric information may include comparing the identified gesture with registered gesture information included in the pre-registered authentication information and calculating a gesture similarity therebetween; comparing the acquired biometric information with registered biometric information included in the pre-registered authentication information and calculating a biometric similarity therebetween; calculating a combined similarity based on the gesture similarity and the biometric similarity; and determining the result of the biometric authentication as success or failure based on a result of comparing the combined similarity with a threshold for the combined similarity included in the pre-registered authentication information.

The process of comparing the identified gesture and the acquired biometric information may include extracting gesture feature information from the identified gesture; extracting biometric feature information from the acquired biometric information; comparing the gesture feature information and the biometric feature information with the pre-registered authentication information to calculate a feature information similarity; and determining the result of the biometric authentication as success or failure based on a result of comparing the feature information similarity with a similarity threshold included in the pre-registered authentication information.

The process of comparing the identified gesture and the acquired biometric information may be carried out upon when the identified gesture and the acquired biometric information are inputted simultaneously.

In accordance with another aspect of the present disclosure, there is provided a biometric authentication method using a portable electronic device, the method including: identifying a gesture of a user to be authenticated through a gesture recognition unit of the portable electronic device; acquiring biometric information of the user through an information input unit of the portable electronic device; comparing the identified gesture and the acquired biometric information with an authentication information stored in an information storage unit to perform the biometric authentication of the user; and outputting a result of the biometric authentication.

The gesture is performed with the portable electronic device and the gesture may be determined by at least one of a motion of the user performed with the portable electronic device, a positional angle of the portable electronic device, and a touch operation on the portable electronic device for a predetermined time period.

The gesture recognition unit may be an inertial sensor; and the motion and the positional angle may be measured by the inertial sensor equipped in the portable electronic device.

The gesture recognition unit may be an imaging device integrally equipped in the portable electronic device; and the positional angle may be measured by the imaging device.

The positional angle may be obtained by measuring a position or a gradient of an object in an image captured by the imaging device.

The process of comparing the identified gesture and the acquired biometric information may include comparing the identified gesture with registered gesture information included in the authentication information and calculating a gesture similarity therebetween; comparing the acquired biometric information with registered biometric information included in the authentication information and calculating a biometric similarity therebetween; calculating a combined similarity based on the gesture similarity and the biometric similarity; and determining the result of the biometric authentication as success or failure based on a result of comparing the combined similarity with a threshold for the combined similarity included in the authentication information.

The process of comparing the identified gesture and the acquired biometric information may include extracting gesture feature information from the identified gesture; extracting biometric feature information from the acquired biometric information; comparing the gesture feature information and the biometric feature information with the authentication information to calculate a feature information similarity; and determining the result of the biometric authentication as success or failure based on a result of comparing the feature information similarity with a similarity threshold included in the authentication information.

The process of comparing the identified gesture and the acquired biometric information may be carried out upon when the identified gesture and the acquired biometric information are inputted simultaneously.

In accordance with still another aspect of the present disclosure, there is provided a biometric authentication apparatus including: a gesture recognition unit configured to identify a gesture of a user to be authenticated; an information input unit configured to receive biometric information of the user; an information storage unit in which authentication information for use in the biometric authentication is registered; and a control unit configured to: compare the identified gesture and the biometric information with the authentication information to perform the biometric authentication of the user, and output a result of the biometric authentication.

The gesture recognition unit may include an inertial sensor.

The gesture recognition unit may include an imaging device.

The gesture is performed with the portable electronic device and the gesture may be determined by at least one of a motion of the user performed with the portable electronic device, a positional angle of the portable electronic device, and a touch operation on the portable electronic device for a predetermined time period; and the motion and the positional angle may be measured by the inertial sensor.

The gesture is performed with the portable electronic device and the gesture may be determined by at least one of a motion of the user performed with the portable electronic device, a positional angle of the portable electronic device, and a touch operation on the portable electronic device for a predetermined time period; and the positional angle may be measured by the imaging device.

The gesture is performed with the portable electronic device and the gesture may be determined by at least one of a motion of the user performed with the portable electronic device, a positional angle of the portable electronic device, and a touch operation on the portable electronic device for a predetermined time period; and the positional angles may be obtained by measuring a position or a gradient of an object in an image captured by the imaging device.

The control unit may be configured to compare the identified gesture with registered gesture information included in the authentication information and calculate a gesture similarity therebetween; compare the biometric information with registered biometric information included in the authentication information and calculate a biometric similarity therebetween; calculate a combined similarity based on the gesture similarity and the biometric similarity; and determine the result of the biometric authentication as success or failure based on a result of comparing the combined similarity with a threshold for the combined similarity included in the authentication information.

The control unit may be configured to extract gesture feature information from the identified gesture; extract biometric feature information from the biometric information; compare the gesture feature information and the biometric feature information with the authentication information to calculate a feature information similarity; and determine the result of the biometric authentication as success or failure based on a result of comparing the feature information similarity with a similarity threshold included in the authentication information.

The biometric authentication apparatus may be a portable apparatus.

The control unit may compare the identified gesture and the biometric information with the authentication information upon when the identified gesture and the acquired biometric information are inputted simultaneously.

As described above, in accordance with aspects of the present disclosure, gestures are additionally authenticated by using a portable electronic apparatus of a user to be authenticated along with biometric authentication. In comparison with the conventional password authentication used together with biometric authentication, gesture authentication allows users to remember their gesture even more easily, and reproduce their gesture at ease.

Therefore, using gesture authentication contributes to improving input convenience and ensuring at least equivalent security because users remember their gestures even more easily than their password in comparison with using password authentication together with biometric authentication.

DETAILED DESCRIPTION OF THE PREFERRED EMBODIMENTS

The advantages and features of the present disclosure and the method for accomplishing them will be clearly understood from the following detailed description of the embodiments taken in conjunction with the accompanying drawings. However, the present disclosure is not limited to those embodiments disclosed herein below, but may be implemented in various forms. It should be noted that the embodiments are provided to make a full disclosure of the present disclosure and also to allow those skilled in the art to know the full scope of the present disclosure. Therefore, the present disclosure will be defined only by the scope of the appended claims.

In the following description, well-known functions and/or constitutions will not be described in detail if they would unnecessarily obscure the features of the present disclosure in unnecessary detail. Further, the terms to be described below are defined in consideration of their functions in the embodiments of the present disclosure and may vary depending on user's or operator's intention or practice. Accordingly, the definition may be made on the basis of the content throughout the specification.

Figure 1:
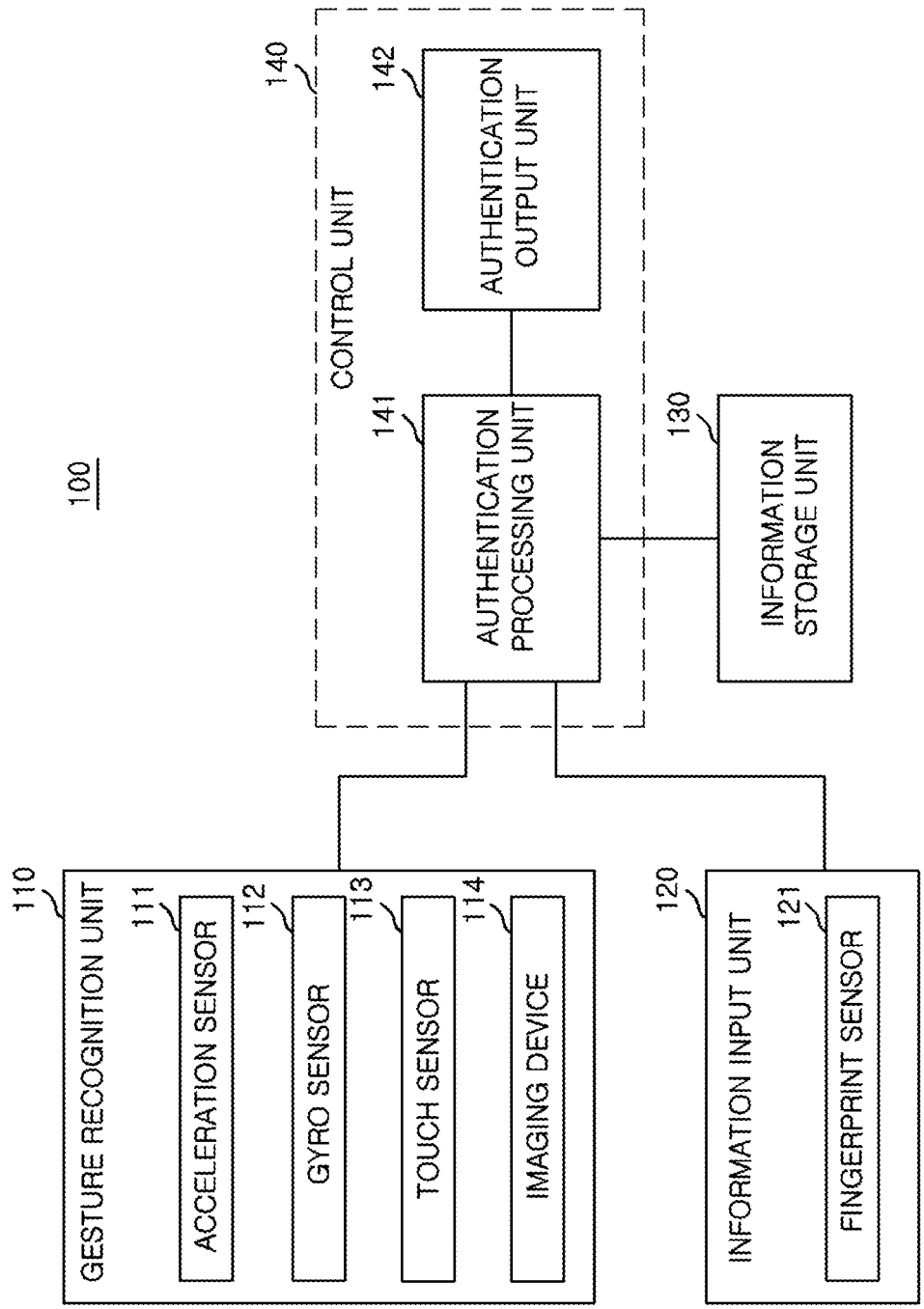
FIG. 1 shows a block diagram of a biometric authentication apparatus using a portable electronic device in accordance with an embodiment of the present disclosure.

FIG. 1 shows a block diagram of a biometric authentication apparatus using a portable electronic device in accordance with an embodiment of the present disclosure.

As shown in FIG. 1, the biometric authentication apparatus 100 in accordance with an embodiment of the present disclosure includes a gesture recognition unit 110, an information input unit 120, an information storage unit 130 and a control unit 140. The gesture recognition unit 110 includes an acceleration sensor 111, a gyro sensor 112, a touch sensor 113 and an imaging device 114. In this example, the acceleration sensor 111 and the gyro sensor 112 are inertial sensors. The information input unit 120 includes a fingerprint sensor 121. The control unit 140 includes an authentication processing unit 141 and an authentication output unit 142.

In the embodiment shown in FIG. 1, although it is illustrated that the portable electronic device employs fingerprint recognition which is one of biometric recognition types, other biometric recognition such as face recognition, voice recognition, hand shape recognition, iris recognition and vein recognition may be employed.

The gesture recognition unit 110 is configured to identify one or more gestures of a user performed with a portable electronic device.

Specifically, the gesture recognition unit 110 can identify one or more gestures of a motion of the user performed with the portable electronic device, a positional angle of the portable electronic device, and a touch operation on the portable electronic device for a predetermined time period. In this example, the motion may be measured by using the acceleration sensor 111 and the gyro sensor 112. The positional angle may be measured by the gyro sensor 112 and the imaging device 114. For example, the positional angle of the portable electronic device may be calculated based on the position or gradient of an object in an image captured by the imaging device 114. Touch operation may be measured by the touch sensor 113.

The information input unit 120 is configured to acquire biometric information of a user (i.e., a person to be authenticated), inputted through the portable electronic device. The information input unit 120 may acquire fingerprint information of the user through the fingerprint sensor 121.

The authentication information used in biometric authentication is registered in the information storage unit 130. For example, the authentication information may include registered gesture information, registered biometric information, a combined-similarity calculation function, a threshold for combined similarity, a similarity threshold, and the like.

The control unit 140 is configured to process the biometric authentication of the user by comparing the gesture identified by the gesture recognition unit 110 and the biometric information inputted through the information input unit 120 with the authentication information registered in advance in the information storage unit 130. The control unit 140 is also configured to output the processing result.

Specifically, the authentication processing unit 141 of the control unit 140 performs the biometric authentication of the user by comparing the gesture identified by the gesture recognition unit 110 and the biometric information acquired by the information input unit 120 with the authentication information registered in advance in the information storage unit 130.

The authentication processing unit 141 compares the gesture identified by the gesture recognition unit 110 with the registered gesture information included in the authentication information to calculate a gesture similarity therebetween. Further, the authentication processing unit 141 compares the biometric information inputted through the information input unit 120 with the registered biometric information included in the authentication information to calculate a biometric similarity therebetween. Next, the authentication processing unit 141 calculates a combined similarity based on the gesture similarity and the biometric similarity. Then, it is determined whether the biometric authentication of the user is succeeded or failed based on the result of comparing the combined similarity with the threshold for the combined similarity included in the authentication information.

Alternatively, the authentication processing unit 141 extracts gesture feature information from the gesture identified by the gesture recognition unit 110, and also extracts biometric feature information from the biometric information acquired by the information input unit 120. Next, the authentication processing unit 141 compares the gesture feature information and the biometric feature information with the pre-registered authentication information to calculate a feature information similarity therebetween. Then, the authentication processing unit 141 determines the success or the failure of the biometric authentication of the user based on the result of comparing the calculated feature information similarity with the similarity threshold included in the pre-registered authentication information.

The authentication output unit 142 of the control unit 140 outputs the processing result of the biometric authentication obtained through the authentication processing unit 141. For example, the authentication output unit 142 outputs the success or the failure of the biometric authentication determined by the authentication processing unit 141 on a screen or as sound so that the user can be aware of the processing result.

Figure 2:
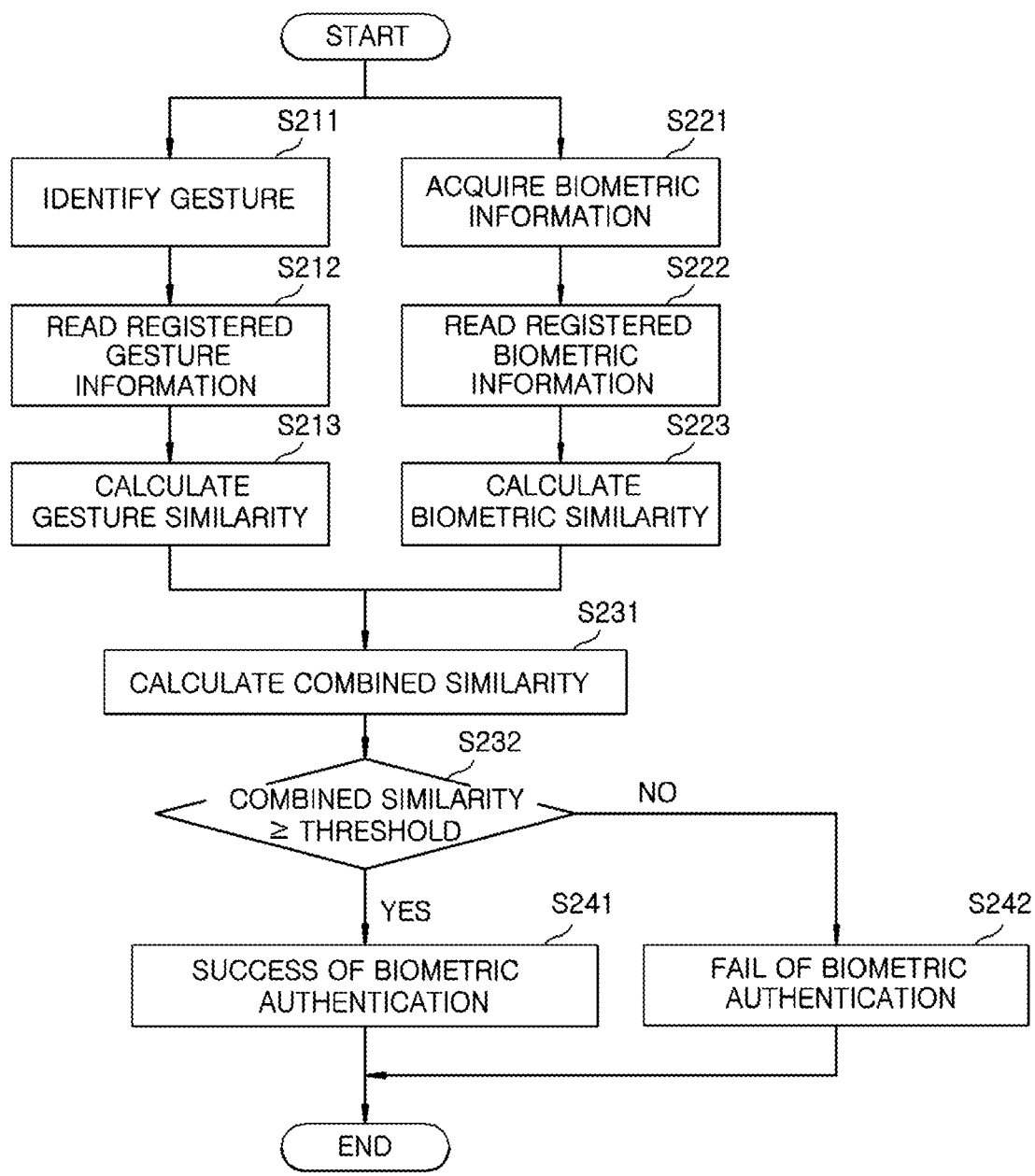
FIG. 2 shows a flow chart illustrating a method for a biometric authentication using the portable electronic device in accordance with an embodiment of the present disclosure.

FIG. 2 shows a flow chart illustrating a method for biometric authentication using a portable electronic device in accordance with an embodiment of the present disclosure.

As shown in FIG. 2, the method for biometric authentication in accordance with an embodiment includes a step S211 of identifying a gesture of a user to be authenticated performed with the portable electronic device. In this embodiment, it is possible to identify one or more gestures which can be selected among a motion of the user performed with the portable electronic device, a positional angle of the portable electronic device, and a touch operation on the portable electronic device for a predetermined time period.

Subsequently, the method further includes steps S212 and S213 of comparing the identified gesture with the registered gesture information included in the pre-registered authentication information and calculating a gesture similarity therebetween.

Furthermore, the method further includes a step S221 of acquiring biometric information of the user, inputted through the portable electronic device.

After that, the method further includes steps S222 and S223 of comparing the acquired biometric information with the registered biometric information included in the pre-registered authentication information and calculating a biometric similarity therebetween.

Next, the method further includes a step S231 of calculating a combined similarity based on the gesture similarity and the biometric similarity.

Moreover, the method further includes steps S232, S241 and S242 of determining success or failure of the biometric authentication of the user based on the result of comparing the combined similarity with the threshold for the combined similarity included in the pre-registered authentication information and then outputting the processing result of the biometric authentication.

Figure 3:
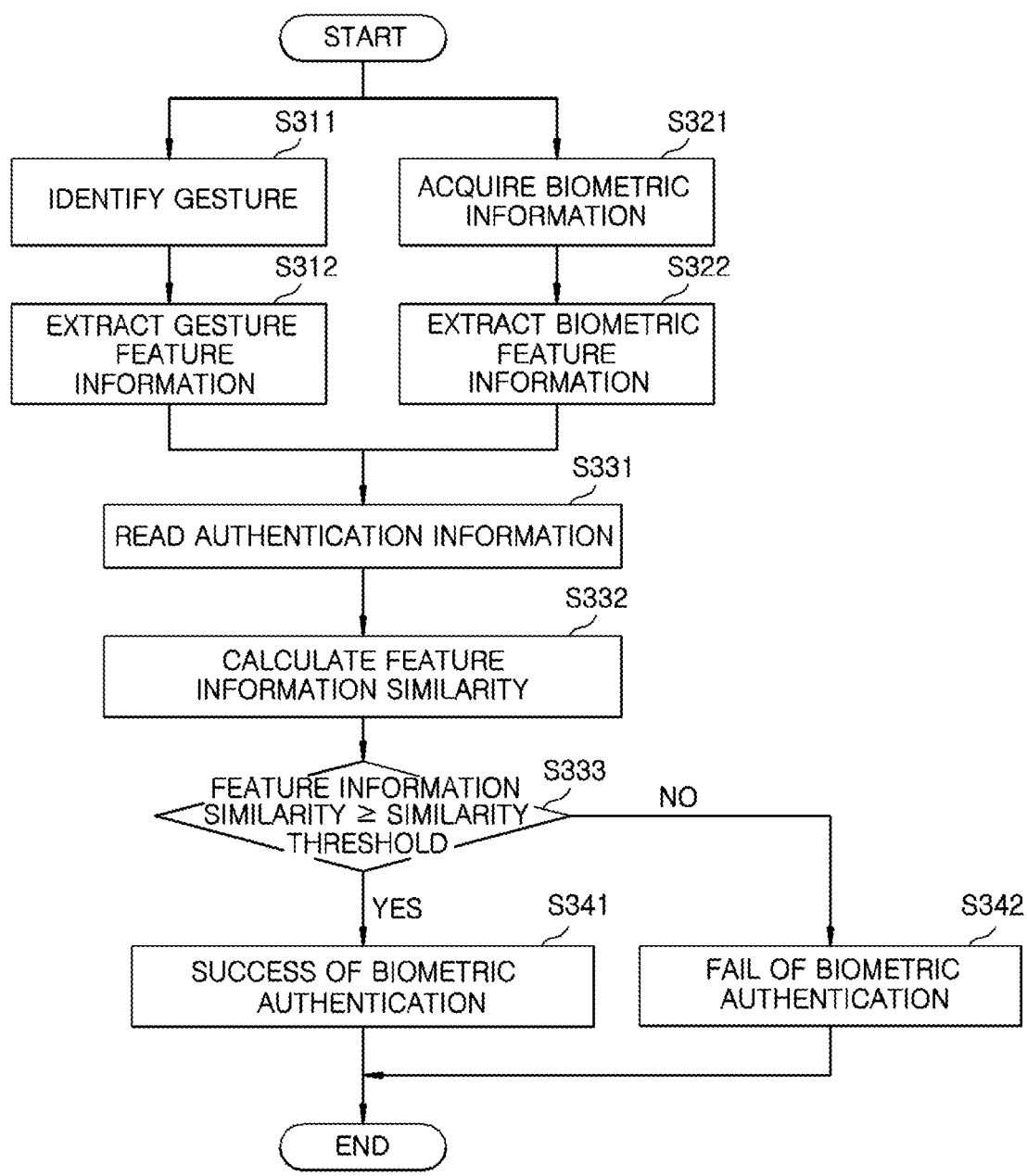
FIG. 3 shows a flow chart illustrating a method for a biometric authentication using the portable electronic device in accordance with another embodiment of the present disclosure.

FIG. 3 shows a flow chart illustrating a method for biometric authentication using a portable electronic device in accordance with another embodiment of the present disclosure.

As shown in FIG. 3, the method for biometric authentication includes a step S311 of identifying a gesture of a user to be authenticated performed with the portable electronic device. In this embodiment, the method may identify one or more gestures, which can be selected among a motion of the user performed with the portable electronic device, a positional angle of the portable electronic device, and a touch operation on the portable electronic device for a predetermined time period.

Next, the method further includes a step S312 of extracting gesture feature information from the identified gestures.

The method further includes a step S321 of acquiring biometric information of the user, inputted through the portable electronic device.

Subsequently, the method further includes a step S322 of extracting biometric feature information from the acquired biometric information.

Next, the method further includes a step S331 of comparing the gesture feature information and the biometric feature information with the pre-registered authentication information, and a step S332 of calculating a feature information similarity therebetween.

Furthermore, the method further includes steps S333, S341 and S342 of determining success or failure of the biometric authentication of the user based on the result of comparing the calculated feature information similarity with the similarity threshold included in the pre-registered authentication information, and then outputting the processing result of the biometric authentication.

Hereinafter, the operation of the biometric authentication apparatus using the portable electronic device in accordance with an embodiment of the present disclosure is described in detail.

First, the user inputs a specific gesture in addition to registering a fingerprint for use in authentication such that the authentication information including gesture information and biometric information for registration is registered in advance in the information storage unit 130.

To this end, the user to be authenticated inputs a fingerprint and a gesture to be used in authentication through the portable electronic device. The gesture recognition unit 110 then recognizes the gesture inputted by the user, and upon recognizing the gesture to be used in authentication, the authentication processing unit 141 of the control unit 140 stores the recognized gesture as the registered gesture information in the information storage unit 130. Furthermore, the information input unit 120 acquires the biometric information inputted by the user, and the authentication processing unit 141 of the control unit 140 stores the inputted biometric information in the information storage unit 130 as the registered biometric information to be used in authentication.

The fingerprint sensor 121 of the information input unit 120 acquires a fingerprint image inputted by the user, and the authentication processing unit 141 may store the fingerprint image information in the information storage unit 130 as the registered biometric information to be used in authentication. Alternatively, the authentication processing unit 141 may extract feature information from the fingerprint image information and then store the extracted fingerprint feature information in the information storage unit 130 as the registered biometric information. Since the process of inputting and registering a fingerprint is a technology known well in the art, specific description thereof will be omitted.

As the gesture to be used in authentication, one or more gestures may be selected among a motion of the user performed with the portable electronic device, a positional angle of the portable electronic device, and a touch operation on the portable electronic device for a predetermined time period.

FIGS. 4A to 4E illustrate an exemplary gesture that may be inputted as the motion of the user performed with the portable electronic device.

Figure 4A:
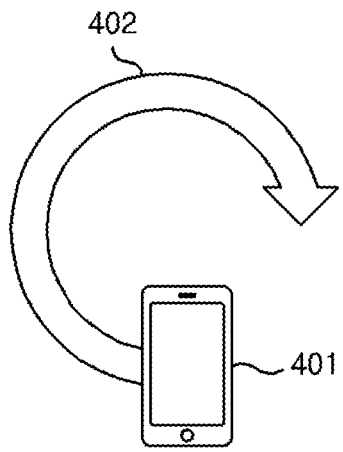
FIGS. 4A to 4E illustrate exemplary gestures that may be inputted as a motion of a user performed with the portable electronic device.
Figure 4B:
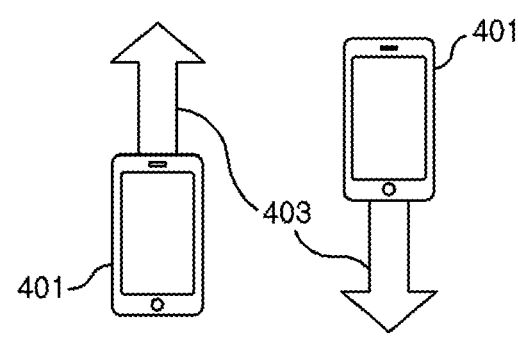
Figure 4C:
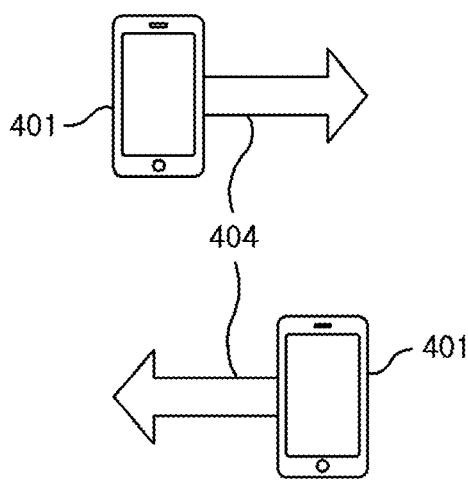
Figure 4D:
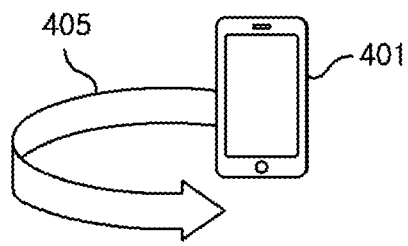
Figure 4E:
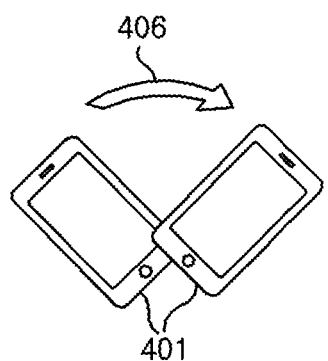

FIG. 4A shows an example of inputting a rotational motion 402 of the user performed with the portable electronic device 401 as a gesture to be used in authentication; FIG. 4B shows an example of inputting up-down motion 403 of the user performed with the portable electronic device 401 as the gesture to be used in authentication; FIG. 4C shows an example of inputting left-right motion 404 of the user performed with the portable electronic device 401 as the gesture to be used in authentication; FIG. 4D shows an example of inputting a circular motion 405 of the user performed with the portable electronic device 401 as the gesture to be used in authentication; and FIG. 4E shows an example of inputting a pivotal motion 406 of the user performed with the portable electronic device 401 as the gesture to be used in authentication.

The aforementioned motions of the user performed with the portable electronic device may be identified by means of an inertial sensor. For example, the gesture recognition unit 110 identifies the gesture based on an acceleration value measured by the acceleration sensor 111 and an orientation change value measured by the gyro sensor 112. For example, the acceleration value measured by the acceleration sensor 111 and the orientation change value measured by the gyro sensor 112 are converted to meta-information for extracting gesture feature information. In this example, exemplary required meta-information includes rotational movement, horizontal movement, rotational movement direction and horizontal movement direction. Gesture feature vector values are extracted from the aforementioned meta-information and are stored in the information storage unit 130 as the registered gesture information for use in authentication.

Figure 5A:
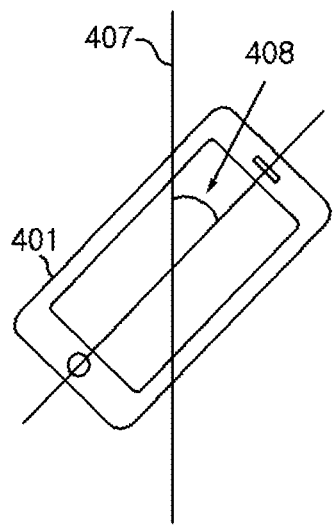
FIGS. 5A and 5B illustrate exemplary gestures that may be inputted as a positional angle of the portable electronic device.
Figure 5B:
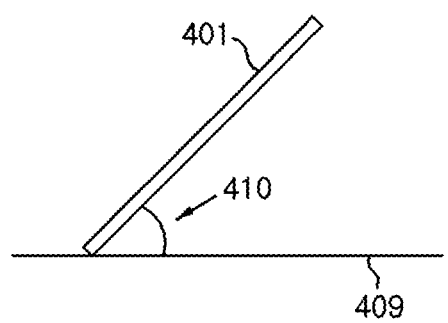

FIGS. 5A and 5B illustrate an exemplary gesture that may be inputted as the positional angle of the portable electronic device.

FIG. 5A shows an example of a gesture for use in authentication which makes an inclination angle 408 when the user holding the portable electronic device 401 inclines the device towards the left side or the right side with respect to the orthogonal axis 407 to the ground. FIG. 5B shows an example of a gesture for use in authentication which makes an inclination angle 410 when the user holding the portable electronic device 401 inclines the device towards the ground 409 but is not completely laid on.

The aforementioned positional angle of the portable electronic device is identified by the gesture recognition unit 110 on the basis of the values of orientation changes measured by the gyro sensor 112. For example, the values of orientation changes measured by the gyro sensor 112 are converted to meta-information for extracting gesture feature information. In this example, exemplary required meta-information includes inclination angles. Gesture feature vector values are extracted from the meta-information and are stored in the information storage unit 130 as the registered gesture information for use in authentication.

Figure 6A:
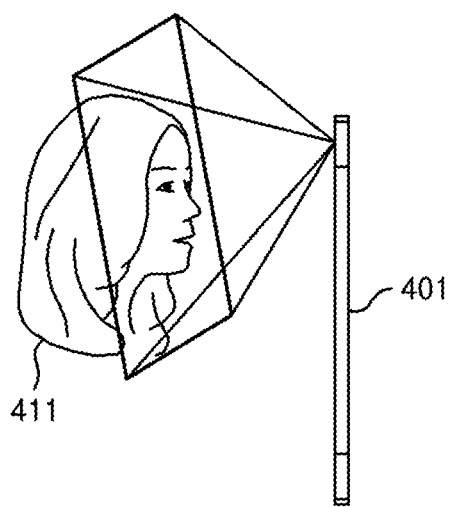
FIGS. 6A and 6B illustrate another exemplary gestures that may be inputted as the positional angle of the portable electronic device.
Figure 6B:
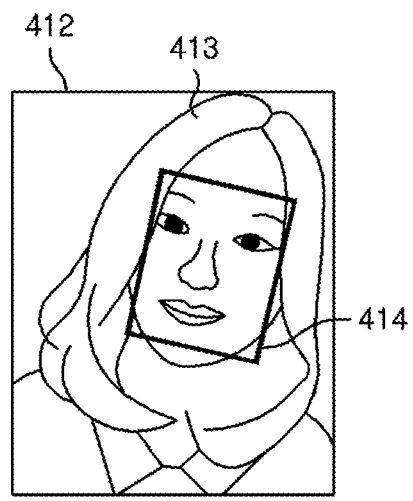

FIGS. 6A and 6B illustrate another exemplary gesture that may be inputted as the positional angle of the portable electronic device.

As shown in FIG. 6A, an imaging device equipped in the portable electronic device 401 captures a user to be authenticated 411 on the assumption that the user 411 stands straight. As shown in FIG. 6B, the position or the inclination of the object 413 in the image 412 is changed depending on how much the portable electronic device 401 is inclined towards the left or right side to capture an image of the user. For example, the gesture recognition unit 110 detects the position of both eyes which are one of face elements by, for example, analyzing the image obtained by the imaging device 114 through the well-known AdaBoost algorithm. Then, the gesture recognition unit 110 recognizes the positional angle of the portable electronic device 401 by estimating the facial area as, e.g., a tetragonal shape 414, based on the position of both eyes and calculating the gradient of the facial area of the estimated tetragonal shape 414.

Figure 7A:
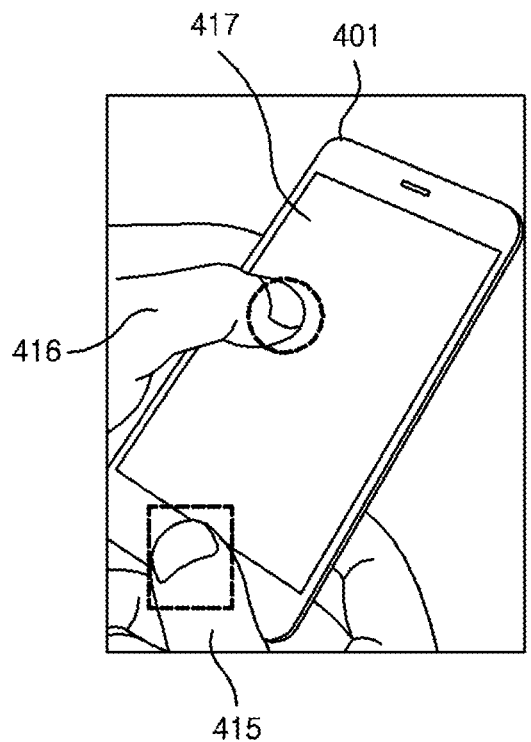
FIGS. 7A and 7B illustrate exemplary gestures that may be inputted as a touch operation on the portable electronic device.
Figure 7B:
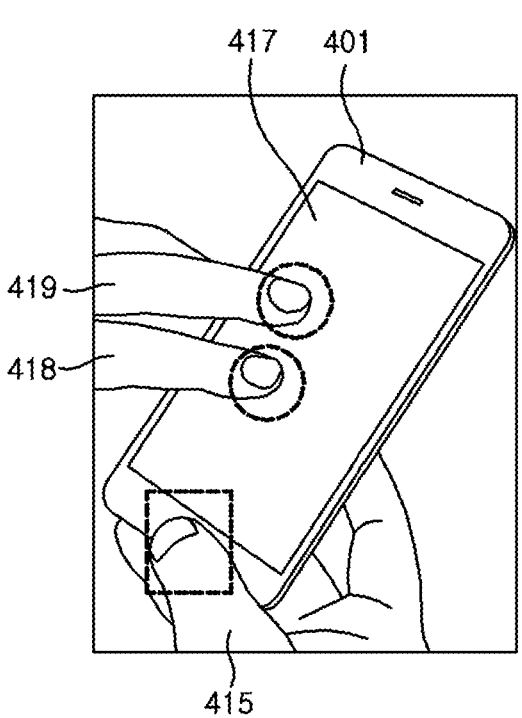

FIGS. 7A and 7B illustrate an exemplary gesture that may be inputted by the touch operation on the portable electronic device.

FIG. 7A illustrates an exemplary gesture for which a user to be authenticated touches a screen 417 of the portable electronic device 401 with the left thumb 416 to input a touch-type gesture while inputting the fingerprint of the right thumb 415. FIG. 7B illustrates an exemplary gesture for which the user touches the screen 417 of the portable electronic device 401 with two left hand fingers 418 and 419 to input a touch-type gesture while inputting the fingerprint of the right thumb 415.

The aforementioned touch-type gestures are measured as touch coordinates by the touch sensor 113, and the authentication processing unit 141 stores the touch coordinates in the information storage unit 130 as the registered gesture information for use in authentication.

Meanwhile, as shown in FIGS. 7A and 7B in which a fingerprint image and a gesture for use in authentication are inputted simultaneously, the gesture for use in authentication may be inputted simultaneously while inputting the fingerprint image, where exemplary gestures include the motion of the user performed with the portable electronic device, a positional angle of the portable electronic device, and a touch operation on the portable electronic device for a predetermined time period.

After the registration, when the user wants to perform the biometric authentication with the portable electronic device, it is necessary to input biometric information and gesture information through a procedure the same as or similar to the biometric information and gesture information registration procedure described above. Here, a sequential input scheme may be used by inputting any one of the biometric information and the gesture information, and then the other information. Alternatively, a simultaneous input scheme may be used to input the biometric information and the gesture information simultaneously.

In case that the simultaneous input scheme is used and the authentication processing unit 141 makes a decision of validity only when the biometric information and the gesture information are inputted simultaneously, it is essential to input the biometric information and the gesture information simultaneously as shown in FIGS. 7A and 7B. In this regard, it is apparent that the simultaneous input scheme is faster than the sequential input scheme in terms of authentication processing speed.

With reference to FIGS. 1 and 2, the method for biometric authentication using the portable electronic device in accordance with an embodiment will be described in detail.

First, a gesture inputted by a user to be authenticated is recognized by the gesture recognition unit 110 and then sent to the authentication processing unit 141 in the step S211. Biometric information inputted by the user is acquired by the information input unit 120 and then sent to the authentication processing unit 141 in the step S221. In this regard, since the process of recognizing the gesture inputted by the user and sending it to the authentication processing unit 141 has been described in detail above while describing the process of registering the gesture information for use in authentication, the detail description thereof will be omitted.

Subsequently, the authentication processing unit 141 reads the registered gesture information included in the pre-registered authentication information in the information storage unit 130 in the step S212, compares it with the gesture received from the gesture recognition unit 110, and then calculates a gesture similarity therebetween in the step S213.

Further, the authentication processing unit 141 reads the registered biometric information included in the pre-registered authentication information in the information storage unit 130 in the step S222, compares it with the biometric information received from the information input unit 120, and then calculates a biometric similarity therebetween in the step S223.

Next, the authentication processing unit 141 reads a combined-similarity calculation function stored in the information storage unit 130 and calculates a combined similarity based on the gesture similarity and the biometric similarity in the step S231. For example, the combined-similarity calculation function may be of a type of giving a weight to the biometric similarity rather than the gesture similarity to add up the similarities.

Then, the authentication processing unit 141 reads a threshold for the combined similarity stored in the information storage unit 130, compares the combined similarity with the threshold in the step S232, and determines success or failure of the biometric authentication for the user based on the comparison result. For example, when the combined similarity in the step S231 is equal to or greater than the threshold, the authentication processing unit 141 determines that the biometric authentication is succeeded. However, the authentication processing unit 141 determines that the biometric authentication is failed when the combined similarity in the step S231 is smaller than the threshold.

After the determination process, the authentication output unit 142 outputs the result of the biometric authentication determined by the authentication processing unit 141. For example, the authentication output unit 142 outputs the result of the success of the biometric authentication through the screen or as sound in the step S241 so that the user can be aware of the success of authentication. Otherwise, the authentication output unit 142 outputs the result of the failure of the biometric authentication through the screen or as sound in the step S242 so that the user can be aware of the failure of authentication.

Hereinafter, with reference to FIGS. 1 and 3, the method for biometric authentication using the portable electronic device in accordance with another embodiment will be described in detail.

First, a gesture inputted by a user to be authenticated is recognized by the gesture recognition unit 110 and sent to the authentication processing unit 141 in the step S311. Biometric information inputted by the user is acquired by the information input unit 120 and sent to the authentication processing unit 141 in the step S321. In this regard, since the process of recognizing the gesture inputted by the user and sending it to the authentication processing unit 141 has been described in detail above while describing the process of registering the gesture information for use in authentication, the detailed description thereof will be omitted.

The authentication processing unit 141 then converts the gesture information received from the gesture recognition unit 110 to meta-information for extracting gesture feature information, and extracts the gesture feature information from the converted meta-information in the step S312.

Further, the authentication processing unit 141 extracts biometric feature information from the biometric information acquired by the information input unit 120 in the step S322. For example, the authentication processing unit 141 may extract biometric feature information such as ridge and valley shapes, ridge direction and ridge curvature from the fingerprint image acquired by the fingerprint sensor 121.

Next, the authentication processing unit 141 reads the registered gesture feature information and the registered biometric feature information included in the authentication information stored in the information storage unit 130 in the step S331. The authentication processing unit 141 compares the gesture feature information extracted in the step S312 and the biometric feature information extracted in the step S322 with the registered feature information. Thereafter, the authentication processing unit 141 calculates a feature information similarity therebetween in the step S332.

The authentication processing unit 141 also reads a similarity threshold included in the authentication information stored in the information storage unit 130, and compares the calculated feature information similarity in the step S332 with the similarity threshold in the step S333. The authentication processing unit 141 determines success or failure of the biometric authentication for the user depending on the comparison result. For example, when the calculated feature information similarity in the step S332 is equal to or greater than the similarity threshold, it is determined that the biometric authentication is succeeded. However, when the calculated feature information similarity calculated in the step S332 is smaller than the similarity threshold, it is determined that the biometric authentication is failed.

After the determination process, the authentication output unit 142 outputs the result of the biometric authentication determined by the authentication processing unit 141. For example, the authentication output unit 142 outputs the result of the success of the biometric authentication through the screen or as sound in the step S341 so that the user can be aware of the success of authentication. Otherwise, the authentication output unit 142 outputs the result of the failure of the biometric authentication through the screen or as sound in the step S342 so that the user can be aware of unsuccessful authentication In accordance with the embodiments of the present disclosure described above, the gesture authentication performed with the portable electronic device of the user to be authenticated is utilized along with the biometric authentication. In comparison with the conventional password authentication used along with a biometric authentication, the gesture authentication enables the user to remember their gesture information and reproduce the remembered gesture even more easily. Therefore, it becomes possible to provide a user-friendly authentication, and ensures security at least equivalent to the conventional authentication.

The combinations of respective sequences of the flow chart attached herein may be carried out by computer program instructions. Since the computer program instructions may be executed by processors of a general purpose computer, a special purpose computer, or other programmable data processing apparatus, the instructions, executed by the processor of the computers or other programmable data processing apparatus, create means for performing functions described in the respective sequences of the sequence diagram. Since the computer program instructions, in order to implement functions in specific manner, may be stored in a memory useable or readable by the computers or the computer for other programmable data processing apparatus, the instruction stored in the memory useable or readable by the computer may produce manufacturing items including an instruction means for performing functions described in the respective sequences of the sequence diagram. Since the computer program instructions may be loaded by a computer or other programmable data processing apparatus, instructions, a series of sequences of which is executed in the computer or other programmable data processing apparatus to create processes executed by a computer to operate the computer or other programmable data processing apparatus, may provide operations for executing functions described in the respective sequences of the flow diagram.

The explanation as set forth above merely provides a technical idea of the present disclosure, and it will be understood by those skilled in the art to which the present disclosure belongs that various changes and modifications may be made without departing from the scope of the characteristics of the present disclosure. Therefore, the embodiments disclosed in the present disclosure are not used to limit the technical idea of the present disclosure, but to explain the present disclosure, and the scope of the technical idea of the present disclosure is not limited to these embodiments. The scope of protection of the present disclosure should be construed as defined in the following claims, and all technical ideas that fall within the equivalent technical idea of the present disclosure are intended to be embraced by the scope of protection of the present disclosure.

What is claimed is:

1. A non-transitory computer-readable storage medium including computer-executable instructions, which cause, when executed by at least one of a handheld electronic device, the handheld electronic device to perform a method for user authentication, the method comprising:
    acquiring biometric information of a user through a biometric sensor of the handheld electronic device;
    capturing, via a camera of the handheld electronic device, an image of the user holding the handheld electronic device at the time of acquiring the biometric information of the user;
    processing the image to determine a positional angle comprising a first inclination angle and a second inclination angle of the handheld electronic device at the time of capturing the image,
        wherein processing the image to determine the positional angle comprises:
            1) analyzing the image to recognize eyes of the user,
            2) estimating a tetragonal shape corresponding to a face of the user based on locations of the eyes on the image, and
            3) computing a gradient of the tetragonal shape in the image,
        wherein the first inclination angle is defined between an axis passing a surface of the handheld electronic device and a vertical reference axis perpendicular to a horizontal plane, wherein the second inclination angle is defined between the surface of the handheld electronic device and the horizontal plane,
        wherein the positional angle comprising the first inclination angle and the second inclination angle of the handheld electronic device at the time of capturing the image is determined based on the gradient of the tetragonal shape computed by processing the captured image rather than values of orientation changes measured by a gyro sensor;
    computing a gesture similarity, which comprises comparing the positional angle with registered user gesture information stored in at least one memory;
    computing a biometric similarity, which comprises comparing the acquired biometric information with registered user biometric information stored in the at least one memory;
    computing a combined similarity, which comprises processing the gesture similarity and the biometric similarity; and
    comparing the combined similarity with a predetermined similarity threshold for authentication of the user.

2. The non-transitory computer-readable storage medium of claim 1, wherein the method for user authentication further comprises determining a motion of the user performed with the handheld electronic device and a touch operation performed on the handheld electronic device for a predetermined time period,
    wherein computing the gesture similarity further comprises processing the registered user gesture information and the motion of the user, and the touch operation.

3. The non-transitory computer-readable storage medium of claim 1, further comprising:
    prior comparing the combined similarity with the predetermined similarity threshold, determining whether acquiring the biometric information and capturing the image were simultaneous so that comparing the combined similarity with the predetermined similarity threshold is performed only when acquiring the biometric information and capturing the image were performed simultaneously.

4. A user authentication method for a handheld electronic device, the method comprising:
    acquiring biometric information of a user through a biometric sensor of the handheld electronic device;
    capturing, via a camera of the handheld electronic device, an image of the user holding the handheld electronic device at the time of acquiring the biometric information of the user;
    processing the image to determine a positional angle comprising a first inclination angle and a second inclination angle of the handheld electronic device at the time of capturing the image,
        wherein processing the image to determine the positional angle comprises:
            1) analyzing the image to recognize eyes of the user,
            2) estimating a tetragonal shape corresponding to a face of the user based on locations of the eyes on the image, and
            3) computing a gradient of the tetragonal shape in the image,
        wherein the first inclination angle is defined between an axis passing a surface of the handheld electronic device and a vertical reference axis perpendicular to a horizontal plane, wherein the second inclination angle is defined between the surface of the handheld electronic device and the horizontal plane,
        wherein the positional angle comprising the first inclination angle and the second inclination angle of the handheld electronic device at the time of capturing the image is determined based on the gradient of the tetragonal shape computed by processing the captured mage rather than values of orientation changes measured by a gyro sensor;
    computing a gesture similarity, which comprises comparing the positional angle with registered user gesture information stored in at least one memory;
    computing a biometric similarity, which comprises comparing the acquired biometric information with registered user biometric information stored in the at least one memory;
    computing a combined similarity, which comprises processing the gesture similarity and the biometric similarity; and
    comparing the combined similarity with a predetermined similarity threshold for authentication of the user.

5. The method of claim 4, wherein a user gesture is further determined by a touch operation on the handheld electronic device for a predetermined time period.

6. The method of claim 5, further comprising:
    prior comparing the combined similarity with the predetermined similarity threshold, determining whether acquiring the biometric information and capturing the image were simultaneous so that comparing the combined similarity with the predetermined similarity threshold is performed only when acquiring the biometric information and capturing the image were performed simultaneously.

7. A handheld electronic apparatus comprising:
    a camera;

a biometric sensor configured to receive biometric information of a user;
a memory storing user authentication information; and
at least one controller configured to process user authentication biometric information received by the biometric sensor and an image of the user captured by the camera at the time of receiving the biometric information, wherein the at least one controller is configured:
to process the image to determine a positional angle comprising a first inclination angle and a second inclination angle of the handheld electronic apparatus at the time of capturing the image,
wherein to determine the positional angle, the at least one controller is configured to:
1) analyze the image to recognize eyes of the user,
2) estimate a tetragonal shape corresponding to a face of the user based on locations of the eyes on the image, and
3) compute a gradient of the tetragonal shape in the image,
wherein the first inclination angle is defined between an axis passing a surface of the handheld electronic apparatus and a vertical reference axis perpendicular to a horizontal plane, wherein the second inclination angle is defined between the surface of the handheld electronic apparatus and the horizontal plane,
wherein the positional angle comprising the first inclination angle and the second inclination angle of the handheld electronic apparatus at the time of capturing the image is determined based on the gradient of the tetragonal shape computed by processing the captured image rather than values of orientation changes measured by a gyro sensor;
to compute a gesture similarity, which comprises comparing the positional angle with registered user gesture information stored in at least one memory;
to compute a biometric similarity, which comprises comparing the acquired biometric information with registered user biometric information stored in the at least one memory;
to compute a combined similarity, which comprises processing the gesture similarity and the biometric similarity; and
to compare the combined similarity with a predetermined similarity threshold for authentication of the user.

8. The apparatus of claim 7, wherein the at least one controller is configured to determining whether receipt of the biometric information and capturing of the image were simultaneous prior to compare the combined similarity with the predetermined similarity threshold.

* * * * *